(12) United States Patent
Westover et al.

(10) Patent No.: US 10,345,110 B2
(45) Date of Patent: Jul. 9, 2019

(54) AUTONOMOUS VEHICLE ROUTING BASED ON CHAOS ASSESSMENT

(71) Applicant: Toyota Motor Engineering & Manufacturing North America, Inc., Erlanger, KY (US)

(72) Inventors: Nathan C. Westover, New Hudson, MI (US); Benjamin M. Geller, Ann Arbor, MI (US); Justin J. Chow, Los Angeles, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/676,033

(22) Filed: Aug. 14, 2017

(65) Prior Publication Data
US 2019/0049257 A1 Feb. 14, 2019

(51) Int. Cl.
*G01C 21/34* (2006.01)
*G05D 1/02* (2006.01)
*G01C 21/28* (2006.01)

(52) U.S. Cl.
CPC ......... *G01C 21/3453* (2013.01); *G01C 21/28* (2013.01); *G05D 1/0276* (2013.01); *G05D 2201/0213* (2013.01)

(58) Field of Classification Search
USPC .......................................................... 701/25
See application file for complete search history.

(56) References Cited

U.S. PATENT DOCUMENTS

| 8,392,117 | B2 | 3/2013 | Dolgov et al. | |
|---|---|---|---|---|
| 8,909,474 | B2 | 12/2014 | McSchooler | |
| 8,972,175 | B2 | 3/2015 | Annapureddy et al. | |
| 9,157,758 | B2 | 10/2015 | Van Seggelen et al. | |
| 2010/0106344 | A1* | 4/2010 | Edwards | E02F 9/205 701/2 |
| 2010/0106356 | A1* | 4/2010 | Trepagnier | G01S 17/023 701/25 |
| 2012/0083964 | A1* | 4/2012 | Montemerlo | G05D 1/0214 701/26 |
| 2012/0316725 | A1* | 12/2012 | Trepagnier | G01S 17/023 701/26 |

(Continued)

FOREIGN PATENT DOCUMENTS

WO WO2014139821 A1 9/2014

*Primary Examiner* — Tyler D Paige
(74) *Attorney, Agent, or Firm* — Christopher G. Darrow; Darrow Mustafa PC

(57) ABSTRACT

A device and method for autonomous vehicle routing based on chaos assessment are provided. A plurality of route options based on destination objective data relative to current autonomous vehicle position data are generated. For each of the plurality of route options, an associated chaos level may be assessed, and an autonomous cooperability metric may be generated based on the associated chaos level. Autonomous selection of a route option of the plurality of route options is based on a favorable autonomous cooperability metric, and an autonomous mission description data is generated based on the route option that includes the favorable autonomous cooperability metric. The autonomous mission description data may be transmitted for autonomously engaging a destination being defined by the destination objective data.

20 Claims, 6 Drawing Sheets

(56) References Cited

U.S. PATENT DOCUMENTS

| | | | |
|---|---|---|---|
| 2013/0013198 A1 | 1/2013 | Adrain | |
| 2015/0179062 A1* | 6/2015 | Ralston | G01C 21/26 |
| | | | 701/117 |
| 2015/0345960 A1* | 12/2015 | Bennah | G01C 21/34 |
| | | | 701/468 |
| 2015/0345967 A1* | 12/2015 | Meuleau | G01C 21/3453 |
| | | | 701/25 |
| 2015/0346718 A1* | 12/2015 | Stenneth | G06Q 30/0611 |
| | | | 701/2 |
| 2016/0033289 A1* | 2/2016 | Tuukkanen | G01C 21/3415 |
| | | | 701/522 |
| 2018/0004211 A1* | 1/2018 | Grimm | G05D 1/0214 |
| 2018/0113450 A1* | 4/2018 | Sherony | G05D 1/0022 |

* cited by examiner vehicle control unit 110 graphical user interface 400 graphical user interface 400

AUTONOMOUS VEHICLE ROUTING BASED ON CHAOS ASSESSMENT

FIELD

The subject matter described herein relates in general to destination routing devices and, more particularly, to autonomous vehicle routing based on a chaos assessment of several route options.

BACKGROUND

Vehicle navigation systems have generally been in use for providing a vehicle user with directions to reach a selected destination. Such navigation have been fundamental directional instructions, such as to turn left or right at an intersection and announcements of the upcoming destination. Navigation systems have improved to provide route options to the driver, such as avoiding toll roads, historically high-collision areas, lowest travel time, etc. Further developments have implemented crowd-source data based on vehicle user cellular devices, in conjunction with on-board location devices, to further relay traffic congestion, traffic collisions, on-going construction and the like. With the advent of autonomous vehicles, route options have simply relied on basic routing for the autonomous vehicle to reach a destination. Such routes, however, have associated chaos scenarios that an autonomous vehicle may not be capable of cooperating with—that is, the artificial intelligence engine of the autonomous vehicle may not be able to compensate or overcome the chaos and be able to accomplish the destination mission.

SUMMARY

A device and method for autonomous vehicle routing based on routing chaos assessment are disclosed.

In one implementation, a method for routing an autonomous vehicle is disclosed. The method includes generating a plurality of route options based on destination objective data relative to current autonomous vehicle position data. For each of the plurality of route options, an associated chaos level is assessed. For at least some of the plurality of route options, the method compares the associated chaos level for a given route option with an autonomous cooperability metric threshold for the autonomous vehicle. Each comparison is indicative of whether the autonomous vehicle is capable of maintaining an autonomous mode of operation for the given route option. The method provides for autonomously selecting a route option of the plurality of route options based on the comparisons such that the autonomous vehicle autonomously reaches a destination defined by the destination objective data. The method generates autonomous mission description data based on the selected route option, and transmits the autonomous mission description data for autonomously driving the destination being defined by the destination objective data.

In another implementation, a vehicle control unit for an autonomous vehicle is disclosed. The vehicle control unit includes a wireless communication interface, a processor, and a memory. The wireless communication interface operates to service communication with a vehicle network. The processor is communicably coupled to the wireless communication interface, and the memory is communicably coupled to the processor and storing a route generation module and an autonomous mission description module. The route generation module includes instructions that, when executed by the processor, cause the processor to generate a plurality of route options based on destination objective data relative to current autonomous vehicle position data. For the each of the plurality of route options, the instructions cause the processor to assess an associated chaos level. The autonomous mission description module includes instructions that, when executed by the processor, cause the processor to receive the route option for the each of the plurality of route options. For at least some of the plurality of route options, the instructions cause the processor to compare the associated chaos level for a given route option with an autonomous cooperability metric threshold for the autonomous vehicle, each comparison indicative of whether the autonomous vehicle is capable of maintaining an autonomous mode of operation for the given route option. The autonomous mission description module autonomously selects a route option of the plurality of route options based on the comparisons such that the autonomous vehicle autonomously reaches a destination defined by the destination objective data. The instructions cause the processor to generate autonomous mission description data based on the selected route option for transmission to autonomously drive the destination defined by the destination objective data.

BRIEF DESCRIPTION OF THE DRAWINGS

The description makes reference to the accompanying drawings wherein like reference numerals refer to like parts throughout the several views, and wherein.

DETAILED DESCRIPTION

Autonomous vehicle routing based on chaos assessment is provided herein. As an example, multiple route options may be generated based on a destination and current autonomous vehicle position data. Vehicle operators may then select a route option for navigation to the destination. Such selection may be based on subjective vehicle operator criteria or user preferences, such as opting for scenic back roads over interstate freeways, avoiding toll roads, etc. Though a vehicle operator may provide similar selection preferences in autonomous vehicle route selection, autonomous vehicles base route selection on respective chaos levels of each route option, and autonomous cooperability metrics. In other words, the autonomous vehicle may consider its capability to engage the selected route option and achieve the mission objective (that is, the destination) in view of an assessed chaos level of the selected route option. By doing so, an autonomous vehicle may make intelligent route selections that avoid routes having excessive chaos levels that can overwhelm the vehicle's autonomous system.

Figure 1:
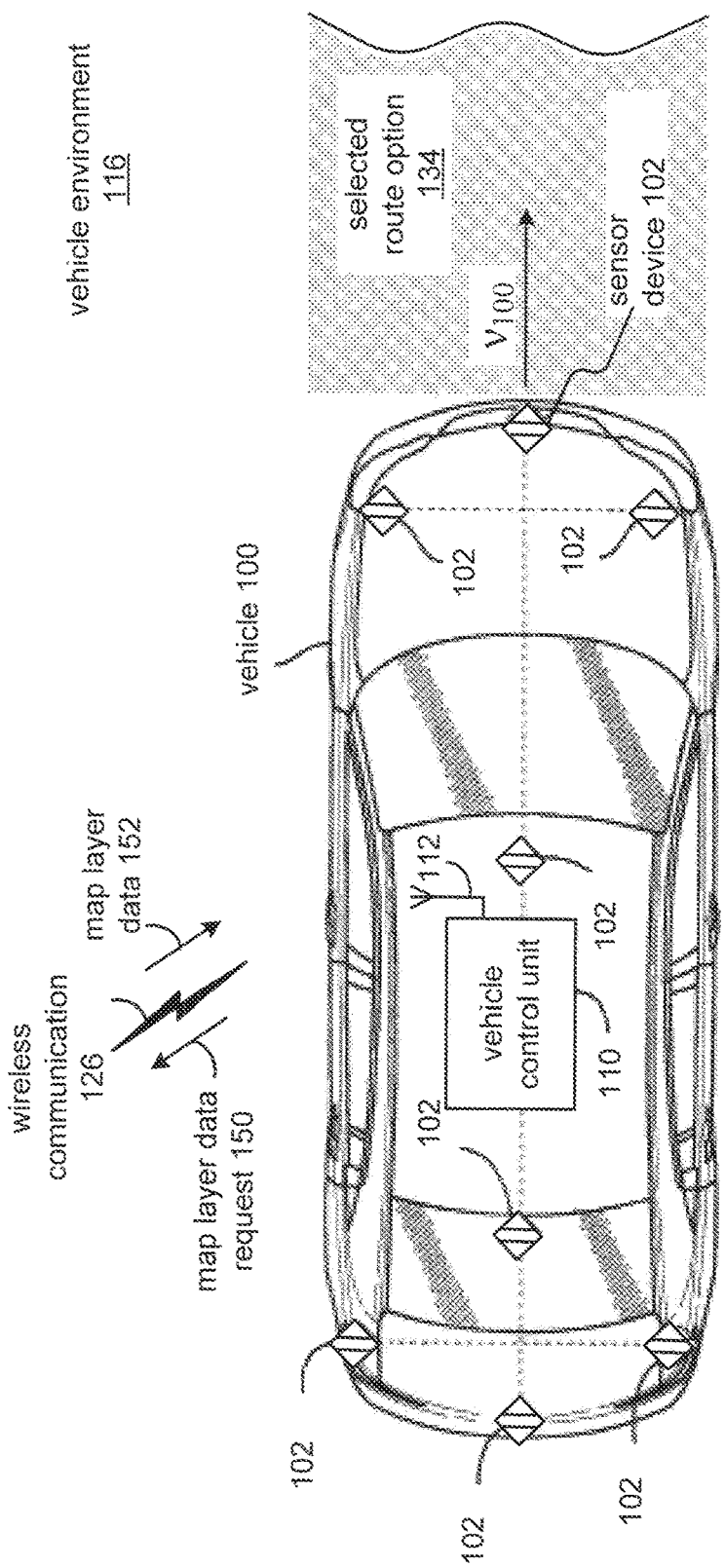
FIG. 1 is a schematic illustration of a vehicle including a vehicle control unit in the context of a vehicle environment.

FIG. 1 is a schematic illustration of a vehicle 100 including a vehicle control unit 110, in the context of a vehicle environment 116. While the vehicle control unit 110 may be depicted in abstract with other vehicular components, the vehicle control unit 110 may be combined with other system components of the vehicle 100. Moreover, the vehicle 100 may also be an automobile or any other passenger or non-passenger vehicle such as, for example, a terrestrial, aquatic, and/or airborne vehicle. In some instances, the vehicle 100 may also be a space vehicle, as relating to a vehicle environment 116 having space junk, other space vehicles and/or debris.

A plurality of sensor devices 102 are in communication with the vehicle control unit 110. The plurality of sensor devices 102 can be positioned on the outer surface of the vehicle 100 or may be positioned in a concealed fashion for aesthetic purposes with regard to the vehicle 100. Moreover, the sensors may operate at frequencies in which the vehicle body or portions thereof appear transparent to the respective sensor device.

Communication between the sensor devices 102 may be on a bus basis and may also be used or operated by other systems of the vehicle 100. For example, the sensor devices 102 may be coupled by a combination of network architectures such as a Body Electronic Area Network (BEAN), a Controller Area Network (CAN) bus configuration, an Audio Visual Communication-Local Area Network (AVC-LAN) configuration, an automotive Ethernet LAN and/or automotive Wireless LAN configuration, and/or other combinations of additional communication-system architectures to provide communications between devices and systems of the vehicle 100.

The sensor devices 102 may operate to monitor local conditions relating to the vehicle 100, including audio, visual, and tactile changes to the vehicle environment 116. The sensor devices 102 may include sensor input devices, audible sensor devices, video sensor devices, and/or combinations thereof.

Sensor devices 102 may provide tactile or relational changes in the ambient conditions of the vehicle, such as a person, object, vehicle(s), etc. One or more of the sensor input devices can be configured to capture changes in velocity, acceleration, and/or distance to these objects in the ambient conditions of the vehicle 100, as well as the angle of approach for the vehicle 100.

The sensor devices 102 may be provided by a Light Detection and Ranging (LIDAR) system, in which the sensor input devices may capture data related to laser light returns from physical objects in the environment of the vehicle 100. Because light moves at a constant speed, LIDAR may be used to determine a distance between a sensor input device and another object with a high degree of accuracy. Also, measurements take into consideration movement of a sensor input device (such as sensor height, location and orientation). Also, GPS location may be associated with each of the sensor input devices for determining sensor movement. The sensory input devices may also include a combination of lasers (LIDAR) and milliwave radar devices.

Audible sensor devices may provide audible sensing of the ambient conditions of the vehicle. With speech recognition capability, audible sensor devices may also receive instructions to move the vehicle 100, or to receive other such directions relating to the vehicle 100. The audible sensor devices may be provided, for example, by a nano-electromechanical system (NEMS) or micro-electromechanical system (MEMS) audio sensor omnidirectional digital microphone, a sound-triggered digital microphone, etc.

Video sensor devices include associated fields-of-view. In autonomous operation, video sensor devices may provide for blind-spot visual sensing (such as for another vehicle adjacent the vehicle 100) relative to the vehicle user, and/or for forward periphery visual sensing (such as for objects outside the forward view of a vehicle user, such as a pedestrian, cyclist, etc.).

In autonomous operation, the vehicle control unit 110 may deploy the sensor devices 102 to provide lane marking readings, to determine vehicle 100 position relative to the road to facilitate operation via the selected route option 134 at a velocity $V_{100}$, etc.

The vehicle 100 can include options for operating in manual mode, autonomous mode, and/or driver-assist mode.

When the vehicle 100 is in manual mode, the driver manually controls the vehicle systems, which may include a propulsion system, a steering system, a stability control system, a navigation system, an energy system, and any other systems that can control various vehicle functions (such as the vehicle climate or entertainment functions, etc.). The vehicle 100 can also include interfaces for the driver to interact with the vehicle systems, for example, one or more interactive displays, audio systems, voice recognition systems, buttons and/or dials, haptic feedback systems, or any other means for inputting or outputting information.

In autonomous mode of operation, a computing device, which may be provided by the vehicle control unit 110, or in combination therewith, can be used to control one or more of the vehicle systems without the vehicle user's direct intervention. Some vehicles may also be equipped with a "driver-assist mode," in which operation of the vehicle 100 can be shared between the vehicle user and a computing device.

When the vehicle 100 is operating in an autonomous (or driver-assist) mode, the vehicle control unit 110 issues commands to the various vehicle systems to direct their operation, rather than such vehicle systems being controlled by the vehicle user.

As shown in FIG. 1, the vehicle control unit 110 may be configured to provide wireless communication 126 through the antenna 112. The wireless communication 126 may provide data access, such as via a network to which the vehicle control unit 110 may issue a map layer data request 150 and receive, in response, map layer data 152 for road conditions and/or configurations, for crowd source data (near real-time and/or historic), as well as to receive data from and/or relating to other vehicles (such as in vehicle-to-vehicle communications and/or vehicle-to-infrastructure communications). In this respect, the vehicle control unit 110 may operate to engage the selected route option 134, via autonomous mission description data, for autonomous vehicle routing, which is discussed in detail with respect to FIGS. 2-6.

Figure 2:
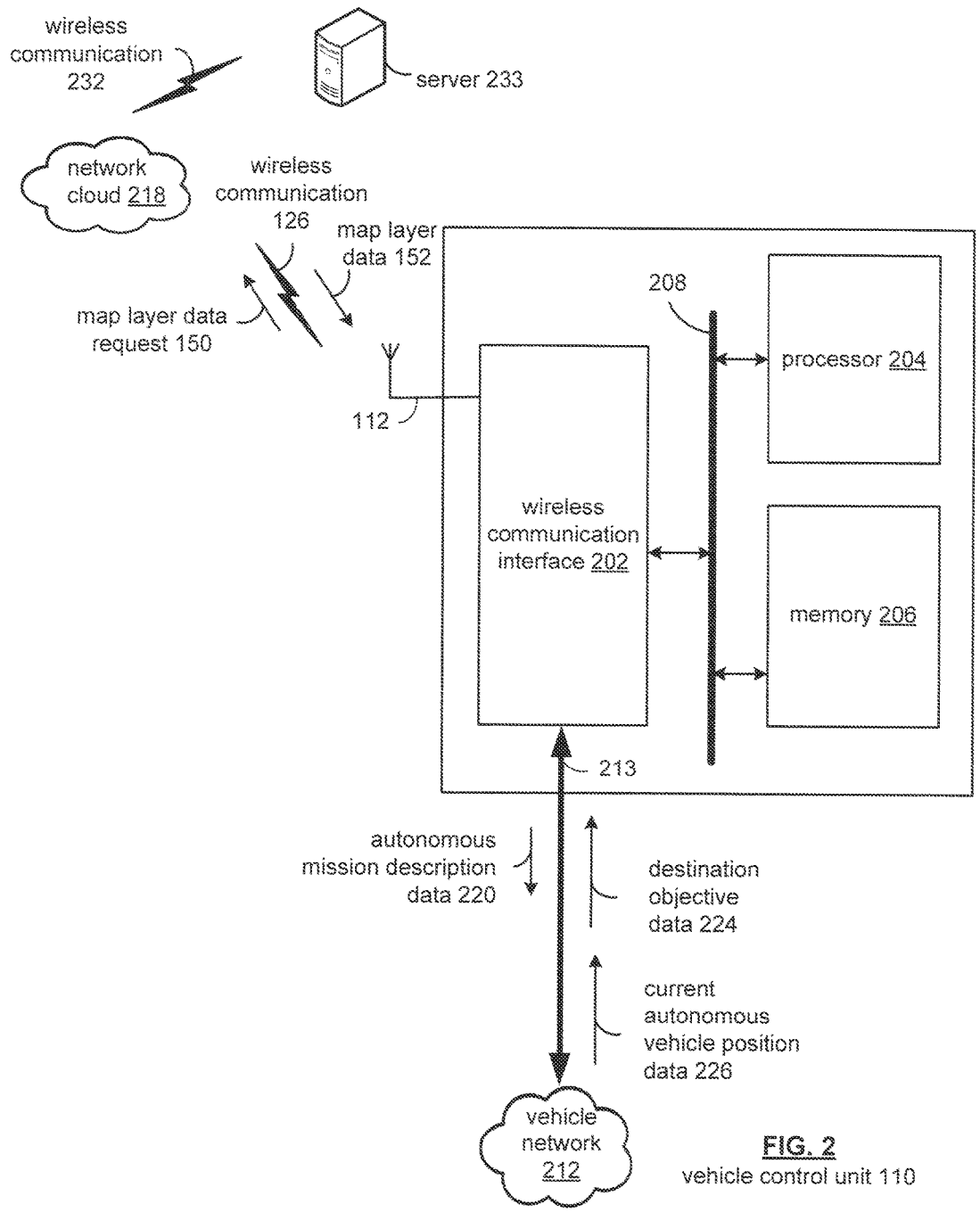
FIG. 2 illustrates a block diagram of the vehicle control unit of FIG. 1.

FIG. 2 illustrates a block diagram of a vehicle control unit 110, which includes a wireless communication interface 202, a processor 204, and memory 206, that are communicatively coupled via a bus 208.

The processor 204 in the vehicle control unit 110 can be a conventional central processing unit or any other type of device, or multiple devices, capable of manipulating or processing information. As may be appreciated, processor 204 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory and/or memory element 206 may be a single memory device, a plurality of memory devices, and/or embedded circuitry of the processor 204. Such a memory device may be a read-only memory, random access memory, volatile memory, non-volatile memory, static memory, dynamic memory, flash memory, cache memory, and/or any device that stores digital information. The memory 206 is capable of storing machine readable instructions such that the machine readable instructions can be accessed by the processor 204. The machine readable instructions can comprise logic or algorithm(s) written in programming languages, and generations thereof, (e.g., 1GL, 2GL, 3GL, 4GL, or 5GL) such as, for example, machine language that may be directly, executed by the processor 204, or assembly language, object-oriented programming (OOP), scripting languages, microcode, etc., that may be compiled or assembled into machine readable instructions and stored on the memory 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 204 includes more than one processing device, the processing devices may be centrally located (e.g., directly coupled together via a wired and/or wireless bus structure) or may be distributed located (e.g., cloud computing via indirect coupling via a local area network and/or a wide area network). Further note that when the processor 204 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processor 204 executes, hard coded and/or operational instructions corresponding to at least some of the steps and/or functions illustrated in FIGS. 1-6 to perform autonomous vehicle routing features and methods described herein.

The wireless communication interface 202 generally governs and manages the input data via the vehicle network 212 over the communication path 213 and/or wireless communication 126. The wireless communication interface 202 also manages controller unit output data such as the autonomous mission description data 220, and data requests, such as map layer data request 150, and also manages control unit input data, such as destination objective data 224, current autonomous vehicle position data 226, and map layer data 152. There is no restriction on the present disclosure operating on any particular hardware arrangement and therefore the basic features herein may be substituted, removed, added to, or otherwise modified for improved hardware and/or firmware arrangements as they may develop.

The vehicle network 212 may be communicatively coupled to receive signals from global positioning system satellites, such as via the antenna 112 of the vehicle control unit 110, or other such vehicle antenna (not shown). The antenna 112 may include one or more conductive elements that interact with electromagnetic signals transmitted by global positioning system satellites. The received signals may be transformed into a data signal indicative of the location (for example, latitude and longitude positions) and further indicative of the positioning of the vehicle with respect to road data, such as current autonomous vehicle position data 226.

The wireless communication 126 may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFD, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), IrDA, Wireless USB, Z-Wave, ZigBee, and/or variations thereof.

The vehicle control unit 110 may be communicatively coupled to a computer via wireless communication 126 and/or other wireless communication. A server 233 may be communicatively coupled to the network cloud 218 via wireless communication 232. The server 233 may include third party servers that are associated with applications that are running and/or executed by the vehicle control unit 110, etc.

For example, map data layers may be executed on the vehicle control unit 110 and further include current autonomous vehicle position data 226 and destination objective data 224. Moreover, such data may be presented to a vehicle user via a graphical map display of a vehicle screen to convey location data to a user of the vehicle 100.

The server 233 may be operated by an organization that provides the application, such as a mapping application and map application layer data including roadway information data, traffic layer data, geolocation layer data, etc. Layer data may be provided in a Route Network Description File (RNDF) format. A Route Network Description File specifies, for example, accessible road segments and provides information such as waypoints, stop sign locations, lane widths, checkpoint locations, and parking spot locations. The route network has no implied start or end point.

The vehicle control unit 110 may operate to generate autonomous mission description data 220, such as a Mission Description Files (MDF) for autonomous vehicle operation. Data relating to the Mission Description File (MDF) may operate to specify checkpoints to reach in a mission, such as a destination set out by destination objective data 224, such as along a selected route option 134 (FIG. 1).

The vehicle control unit 110 functions to determine a selected route option 134 for autonomous vehicle routing. The autonomous vehicle routing may be based on route condition data provided via map layer data 152 received via the wireless communication 126, based on vehicular metric data relating to other vehicles via the vehicle-to-vehicle communications and/or vehicle-to-infrastructure communication, and/or a combination thereof, which may similarly be provided via wireless communication 126, and which is discussed in detail with reference to FIGS. 3-6.

Figure 3:
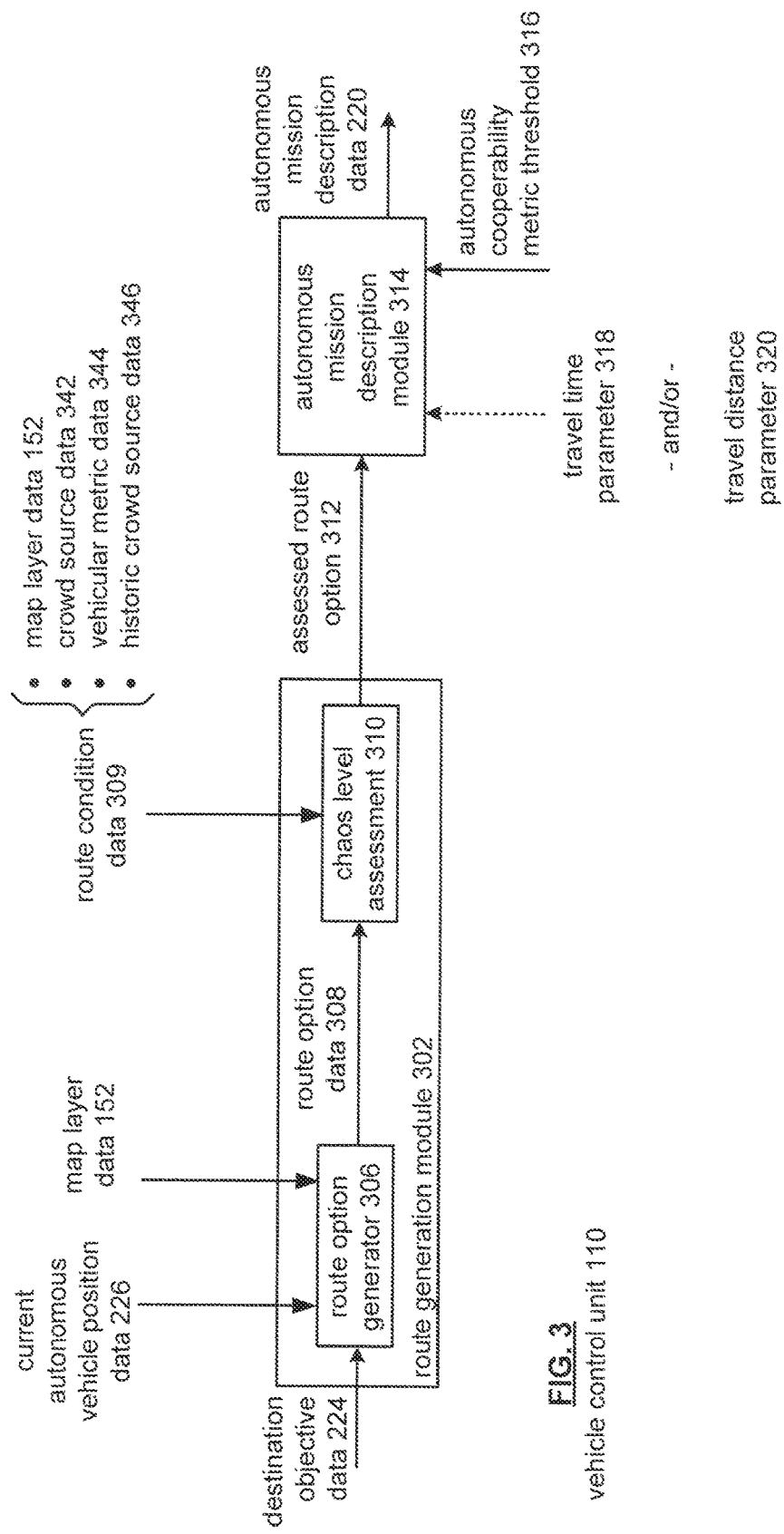
FIG. 3 illustrates a functional block diagram of the vehicle control unit of FIG. 1 for providing autonomous vehicle routing.

FIG. 3 illustrates a functional block diagram of the vehicle control unit 110 for providing autonomous vehicle routing.

Generally, autonomous and/or driverless vehicles may recognize praise for the perceived efficiencies over manual vehicle operation. Vehicles that are capable of communicating with one another (such as through vehicle-to-vehicle and/or vehicle-to-infrastructure communications) will be capable of alerting other vehicles of when the vehicle changes lanes or needs to slow down, which can eliminate uncertainty and/or chaos resulting from manual operation of the vehicles. Also, autonomous vehicles may avoid accidents, which are considered a major cause of slow down and of roadway incidents. Also, when all vehicles on a roadway are autonomous, a large part of the chaos introduced by human error and lapses in judgment may be removed. Nevertheless, until such time, human operators introduce chaos to autonomous vehicle operation. With this respect, autonomous vehicle routing described in the embodiments herein may operate to identify chaos sources on route options and may engage a selected route option within an autonomous cooperability metric of the vehicle 100. In effect, the vehicle control unit 110 may function to provide basic iterative actions including navigation along a selected route option 134 (FIG. 1) and provide appropriate planning to flow interrupts and/or roadway chaos.

The vehicle control unit 110 may include a route generation module 302 and an autonomous mission description module 314, which the memory 206 stores, and each module includes instructions that, when executed by the processor 204, provide respective functionality.

Route generation module 302 includes instructions relating to a route option generator 306 and a chaos level assessment 310. In operation, the route options generator 306 receives destination objective data 224. The destination objective data 224 may be pre-programmed data relating to routine activities (such as shopping, work, leisure activities, etc.) that the vehicle control unit 110 may discern. In another aspect, a user may provide the destination objective data 224 via a human-machine interface, such as a touch screen device (such as may be presented by a vehicle head unit), through voice command (such as via a microphone providing speech-to-text command functionality), through a handheld mobile device communicably coupled to a vehicle network 212, etc.

The route option generator 306 may generate a plurality of route options, via route option data 308, based on destination objective data 224 and current autonomous vehicle position data 226. As may be appreciated, current autonomous vehicle position data 226 may be retrieved from via global positioning satellite (GPS) data or other formats of other location data devices.

Route option data 308 may be generated based on the map layer data 152, which may be provided responsive to a map layer data request 150 (FIG. 2) by the vehicle control unit 110. The route option data 308 may operate to indicate a chaos level in a mixed autonomous and non-autonomous vehicle environment. As may be appreciated, the greater a chaos level, the lower the autonomous cooperability. Put another way, successful autonomous operation (that is, to achieve a destination) may be considered as a function of addressing various levels of chaos. For example, a third-party collision may produce traffic congestion; however, further factors include whether all lanes are now closed and whether the autonomous vehicle will have a capacity to re-route or simply stay on the selected route option until clear. In other words, the degree that the artificial intelligence has been developed and/or matured may fluctuate among varying autonomous vehicles.

Other chaos examples may include vehicle break-down, tire failures, sudden and/or unexpected change in a manually-operated vehicle's position, speed on the road, falling rock, etc.

The chaos level assessment 310 operates to receive route option data 308 serially or in parallel from the route option generator 306. For each of a plurality of route options, the chaos level assessment may operate to assess an associated chaos level, generate an autonomous cooperability metric based on the associated chaos level, and produce an assessed route option 312.

As may be appreciated, a chaos level for a route option may be based on route condition data 309. The route condition data 309 may be based on map layer data 152, near real-time crowd source data 342, near real-time vehicular metric data 344, and/or historic crowd source data 346.

Map layer data 152 may convey route conditions, such as undeveloped roadways, no shoulders and/or lane markings, etc., which have a greater chaos level than improved roadways with defined lane markings. Moreover, map layer data 152, depending upon a refresh rate, may convey route construction affecting a chaos level for a route option.

Near real-time vehicular metric data 344 may include collaboration between various vehicles via vehicle-to-vehicle and/or vehicle-to-infrastructure communications. Autonomous and/or driver-assist vehicles can be configured to broadcast their vehicle metrics, such as speed and location data, in near real-time. Such information can be used to assess an associated chaos level for a route option, and/or segments thereof. As an example, based on speed data obtained from other vehicles, speed profiles for the other vehicles can be generated. Volatile or chaotic speed profiles may be indicative of an unpredictable driving conditions, which would create a low autonomous cooperability metric for that route option.

Alternatively or in addition, the near real-time vehicular metric data 344 may indicate that a number and/or percentage of vehicle volume exceeding a speed limit can indicate excessive chaos and again, render a low autonomous cooperability metric for that route option.

In another aspect, frequent lane changes by one or more vehicles can be an indicator of an elevated chaos level for a route option. In mixed or largely manual driving vehicles, frequent lane changes beyond a lane change threshold within a predefined distance (e.g., five lane changes in a quarter mile) may be considered to include an elevated chaos level.

Near real-time crowd source data 342 may be based on GPS-based locations of roadway users via respective handheld mobile devices (via on-board GPS devices). The general speeds of the handheld mobile devices indicate the traffic flow (or traffic incidents) for at least a portion of a route. Visually, the traffic flow rate may be conveyed as map layer data 152, and for machine-to-human display purposes, presented via a vehicle display (such as a vehicle head unit display, a heads-up display, and/or other vehicle screen device).

As an example, a colored overlay appears on top of major roads and motorways, with green representing a normal traffic flow, yellow representing slower traffic conditions, red indicating congestion, and dark red indicating nearly stopped or stop-and-go traffic for a roadway. The underlying data values may be used by the vehicle control unit 110 to determine chaos levels, and an autonomous cooperability metric threshold 316 may be utilized to determine whether an autonomous vehicle 100 may counter the resulting chaos level.

Historic crowd source data 346 may provide an indication of a level of chaos to occur and/or to develop. An aspect of data 346 may be collision likelihood for a time of day for a route option. That is, the chaos level for a route option may be based on a given time-of-day, day-of-the-week, or a combination thereof. Governmental or nongovernmental sources, accessible via a server 233 (FIG. 2) may collect such data. Such data may then be used to generate history profiles for certain route options. Further information may be based on chaos resulting from events ending (such as sports venues, concerts, festivals, etc). For example, if there is a golf tournament taking place on a particular date, then it can be assumed based on historic crowd source data 346 that an elevated chaos level results from golf carts on a route, increased traffic congestion and/or vehicle collisions near the tournament site.

Accordingly, the chaos level assessment 310 may include instructions that cause the processor 204 to produce the assessed route option 312 for the each of the plurality of route options.

The autonomous mission description module 314 may include instructions, that when executed, cause the processor 204 of the vehicle control unit 110 to autonomously select the assessed route option of the each of the plurality of route options that includes a favorable autonomous cooperability metric to produce a selected route option. The assessed route option 312 includes an autonomous cooperability metric that compares favorably with the autonomous cooperability metric threshold 316, such as when the autonomous cooperability metric comes within the threshold 316. The threshold 316 relates to the autonomous capability of the vehicle 100, which may be provided via the vehicle control unit 110 and/or other control unit of the vehicle 100. The more advanced the autonomous capability, such as the artificial intelligence (AI) engine, ability to adapt, etc., the higher the chaos level that the vehicle control unit 110 may endure to achieve a vehicle objective, such as reaching a destination.

The autonomous mission description module 314 may include instructions, that when executed, cause the processor 204 of the vehicle control unit 110 to generate autonomous mission description data 220 based on the selected route option for transmission. The autonomous mission description data 220 may be transmitted to other modules of the vehicle 100 to provide powertrain control to autonomously engage a destination being defined by the destination objective data 224. As may be also appreciated, the function described herein may be provided remotely, and transmitted to the vehicle control unit 110 for execution by the processor 204. Also, in the event multiple selected route options may come within the autonomous cooperability metric threshold 316, the route option may further be selected based on a favorable comparison with a travel time parameter 318 and/or travel distance parameter 320, such as the assessed route option 312 that may also have the lower travel time and/or distance with respect to other route options. Parameters 318 and/or 320 may be based on an optimization basis by the vehicle control unit 110 (such as to optimize fuel and/or energy resources) or may be based on vehicle user input via a human-to-machine interface (such as a head unit display, a handheld mobile device app, etc.).

As may be appreciated, in another aspect, the chaos level assessment 310 and resulting assessed route option 312 may be generated by remote processing with respect to the vehicle control unit 110 to reduce a processing load to the local processor of the vehicle, such as that of processor 204 of FIG. 2. Such remote processing may include cloud processing accessible via a network cloud 218 (FIG. 2), allowing storage and data access and application and/or program access via the network cloud 218, freeing the processor 204 and memory 206 (FIG. 2) of the vehicle control unit 110. As may be appreciated, the term "cloud" is a metaphor for the Internet. In this respect, the chaos level assessment may also be available for other vehicle control units 110 of other vehicles 100.

Figure 4:
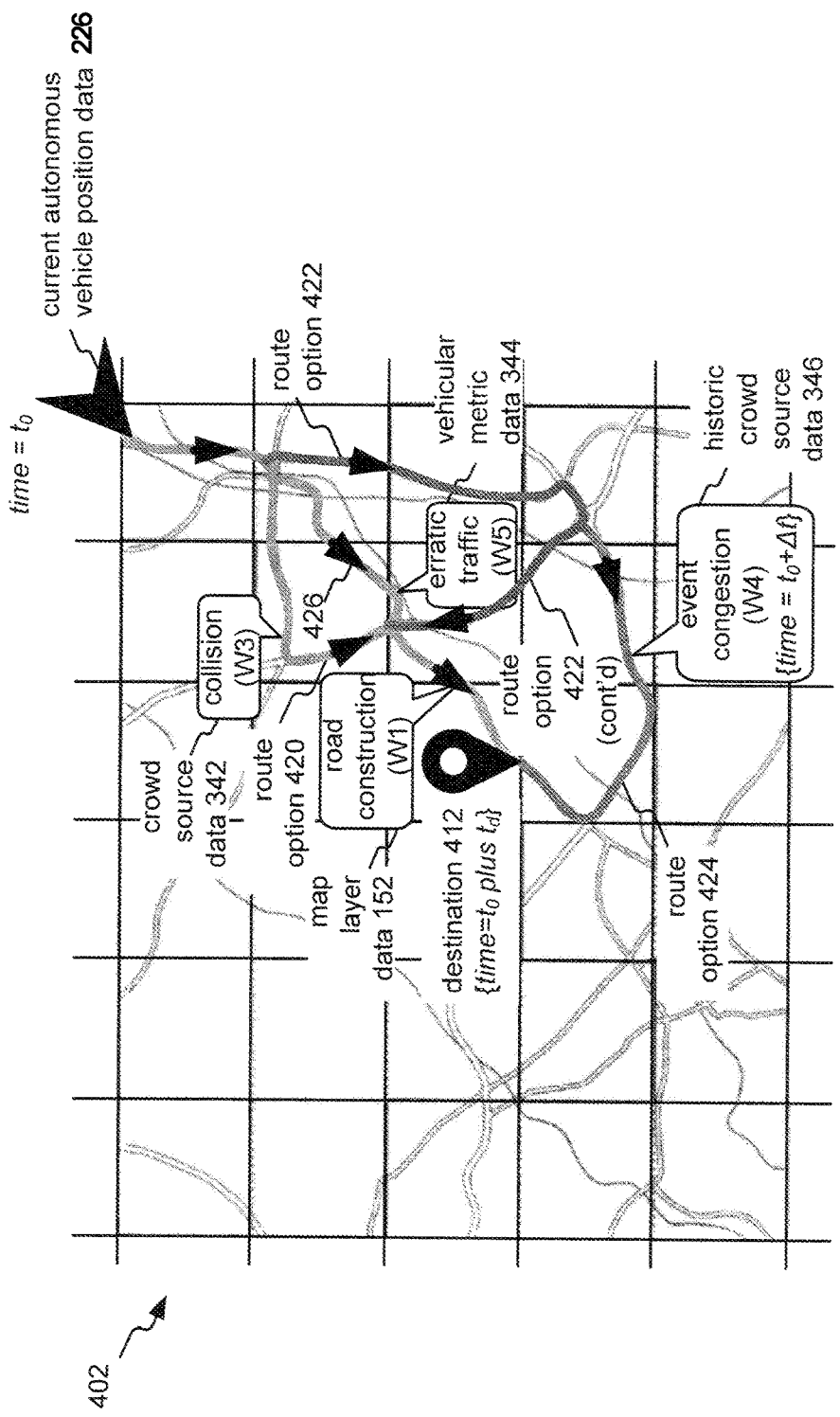
FIG. 4 illustrates an example graphical user interface representing the underlying data and associated chaos levels for a plurality of route options overlaid with a map depiction.

FIG. 4 illustrates an example graphical user interface 400 representing the underlying data and associated chaos levels for a plurality of route options 420, 422, 424, 426, 428 overlaid with a map depiction 402, which may be based on map layer data 152. As noted, chaos may be introduced to a vehicle environment by human driving error, such as excessive speed, excessive lane changes, judgment error, etc. Chaos may also be introduced by infrastructure conditions and/or events, such as collisions (resulting in lane closures), road construction, road deterioration (such as pot holes, rough surfaces, etc.), road maintenance (lane closures, congestion), and/or event congestion.

Each of the plurality of route options 420, 422, 424, 426 may be based on routing for achieving a destination 412, based on destination objective data 224 (FIG. 3), and current autonomous vehicle position data 226.

In general, route condition data 309 (FIG. 3) may be based on map layer data 152, near real-time crowd source data 342, near real-time vehicular metric data 344, and/or historic crowd source data 346. Each of the plurality of route options 420, 422, 424, 426 may include segments shared with one another, as well as segments independent of each other. In this respect, the plurality of route options may be parsed to form a sectional data set for each of the plurality of route options 420, 422, 424, 426. Also, associated chaos levels for each one of the respective sectional data sets may be weighting, such as from W0 (default) to W5, from lowest-to-highest chaos levels. As may be appreciated, further granularity may be defined with additional weighted chaos levels (such as from W0 to W09, etc.).

For the example of FIG. 4, route option 420 includes crowd source data 342 indicating a collision, which may be weighted as an associated chaos level W3 for a section of the sectional data set relating to route option 420.

Route option 424 includes historic crowd source data 346 indicating an event congestion, which may be weighted as an associated chaos level W4 for a section of the sectional data set relating to route option 424. Based on an assessment by the vehicle control unit 110, the event congestion may not be present. For example, when the event is a golf tournament anticipated to end around 15:00, and the current time of the current autonomous vehicle position data 226 is 13:00, the vehicle 100 has two-hours to "beat" the end of the golf tournament. In this respect, the anticipated travel time to the event may negate the chaos level of the event. If so, the weighting for the associated chaos level of the route option 424 would be W0. In this respect, other criteria may be considered by the vehicle control unit 110 towards selecting the route option having a lowest associated chaos level. Examples of such other criteria may include travel time criteria (the amount of time to reach the destination at time equals $t_o$ plus $t_d$) and/or travel distance criteria (the overall distance traveled to reach the destination 412). These values may be generated by the vehicle control unit 110, such as to optimize vehicle resources (such as fuel, battery charge, etc.), as well as arriving at a reasonable time interval. A vehicle user may also provide their preferences via a machine-to-human interface (such as a vehicle head unit display).

Route option 426 includes vehicular metric data 344 indicating erratic traffic, which may be weighted as an associated chaos level W5 for a section of the sectional data set relating to route option 426.

As shown, route options 420, 422, 426 include map layer data 152 indicating road construction, which may be weighted as an associated chaos level W1 for each one of the sectional data sets relating to route options 420, 422, and 426; that is, each route option includes some level of chaos, except for route option 424, which may or may not based on time-of-day.

Accordingly, the respective weighting of the associated chaos level for route option 420 is W3; for route option 422 is W1; for route option 424 is W3; for route option 426 is W5. As shown, the associated chaos level relates to the highest level along the route option, based on location and opportunity to avoid or minimize chaos (such as route option 422 may be used to avoid the chaos associated with the "event congestion" of route option 424, when present).

Accordingly, the route option with a low associated chaos level is route option 422 with a weighting of W1. The route option with a high associated chaos level is route option 426 with a weighting of W5 relating to the erratic traffic exhibited by the vehicular metric data 344.

Autonomous vehicle routing may be based on a selection of one of the route options, which in the present example, may include route options 420, 422, 424 and 426. With reference to the artificial intelligence engine of an autonomous vehicle, different methods may include different autonomous cooperability metrics. That is, some artificial intelligence engines may be more robust than others in chaotic vehicle environments generally, or further refinements in the algorithms and/or algorithms yet to be developed, may produce further robustness in higher chaos environments. Generally, a level of instantaneous chaos can be present with the intermixing of autonomous and manually-operated vehicles on roadways. The embodiments presented herein provide for intelligent autonomous route selection taking into consideration available data relating to routing options. With respect to route selection, an autonomous vehicle may base the option on the artificial intelligence engine's autonomous cooperability metric—that is, the capability of an artificial intelligence engine to co-exist and operate in different and varying vehicle environments. With a low autonomous cooperability metric, low levels of chaos may be tolerable in accomplishing the task (such as accomplishing a destination goal); in contrast, a high autonomous cooperability metric may accommodate higher levels of chaos in the vehicle environment.

Accordingly, a route option may be selected in view of an autonomous cooperability metric threshold related to an autonomous vehicle. As may be appreciated, the threshold may vary among different agents (that is, different autonomous vehicle), including considerations such as vehicle performance capabilities and artificial intelligence engine capabilities.

For the example of FIG. 4, with a low autonomous cooperability metric threshold, route option 422 may be selected in view of the relatively low chaos level with respect to the other route options 420, 424 and 426.

On the other hand, a higher autonomous cooperability metric threshold may permit broader route selection, such as that of either route options 420 (W3) and 422 (W1). When so, further criteria may be utilized to provide autonomous route selection between multiple available routes, such as a travel time parameter and/or travel distance parameter. Such parameters may be based on an optimization basis by the vehicle control unit 110 (such as to optimize fuel and/or energy resources), or may be based on vehicle user input via a human-to-machine interface (such as a head unit display, a handheld mobile device app, etc.). Accordingly, based on subsequent selection criteria, route option 420 may be selected in view of shorter travel distance, and depending on the specifics of the collision (such as travel time delay, number of lane closures, the time collision occurred, etc.), may also provide a shorter travel time than those that may be associated with route option 422.

Figure 5:
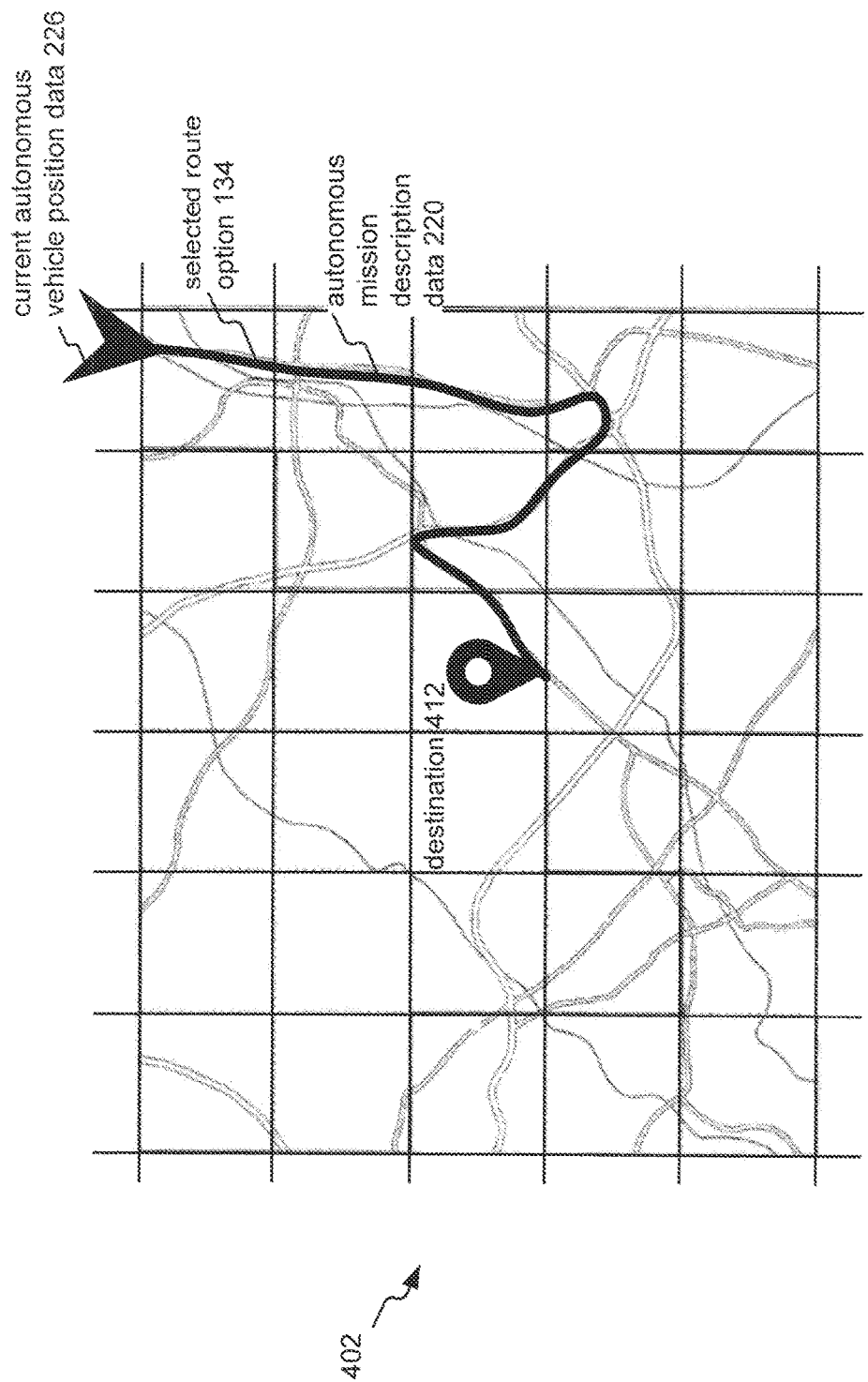
FIG. 5 illustrates an example graphical user interface representing the selected route option of the route options of FIG. 4.

FIG. 5 illustrates an example graphical user interface 400 representing the selected route option 134 of the route options of FIG. 4 overlaid with a map depiction 402. The selected route option 134 provides an objective of destination 412 with respect to current autonomous vehicle position data 226. As noted, selected route option may be based on autonomously selecting a route option of the plurality of route options 420, 422, 424, 426 (FIG. 4) that includes a favorable autonomous cooperability metric.

Based on the route option 134, the vehicle control unit 110 of the vehicle 100 (FIG. 1) may generate autonomous mission description data, which may be transmitted for autonomously engaging the destination 412, which may be defined by the destination objective data 224 (FIG. 3) by an artificial intelligence engine of the vehicle control unit 110, by a vehicle user (via a human-to-machine interface, such as head unit touch screen, a handheld mobile device, etc.). The autonomous mission description data 220 may be provided in a Mission Description Files (MDF) format for autonomous vehicle operation. Autonomous mission description data 220 may operate to specify checkpoints to reach in a mission, such as a destination 412 set out by destination objective data 224, such as along a selected route option 134.

Figure 6:
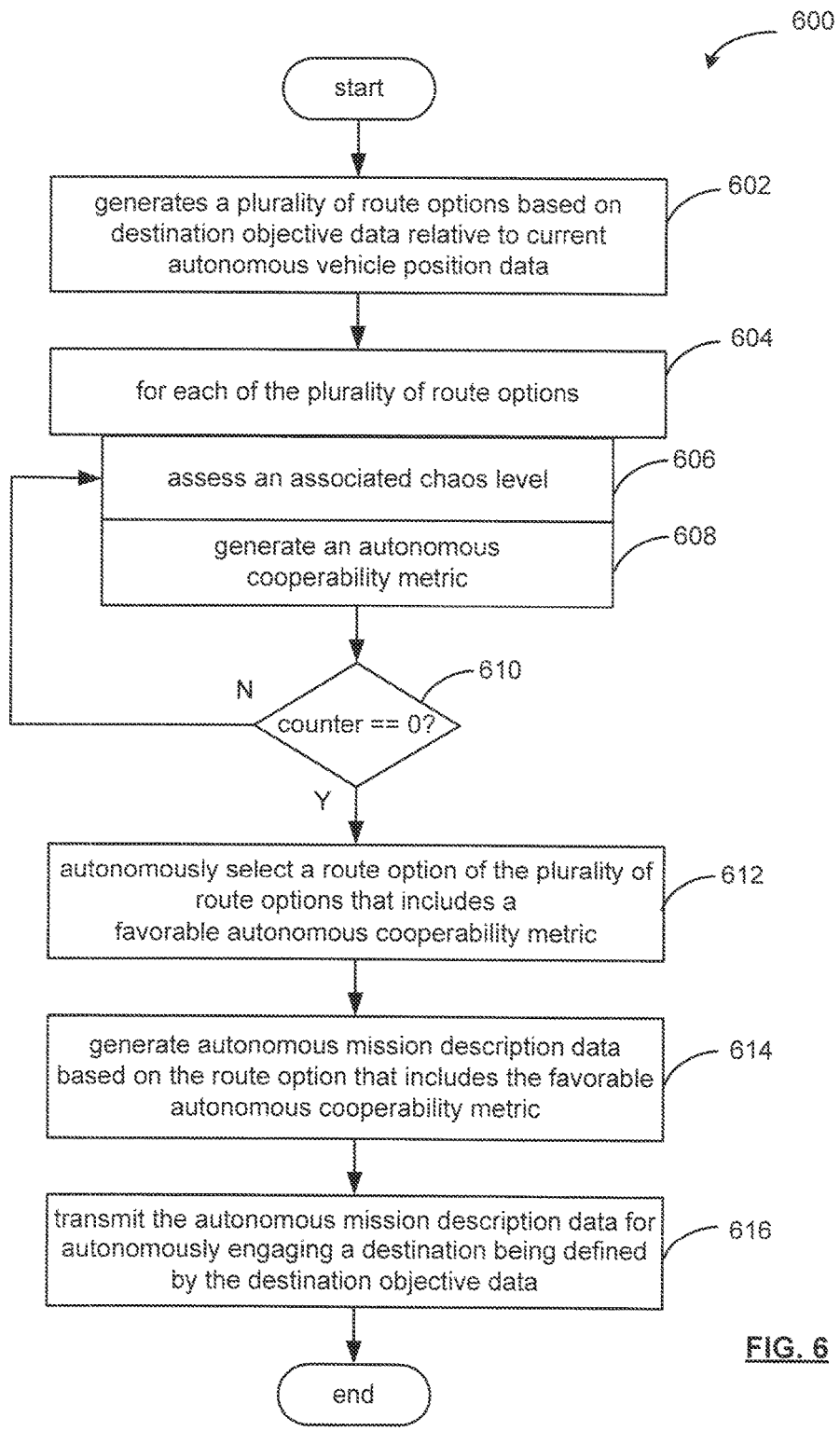
FIG. 6 shows an example process for autonomous vehicle routing based on chaos assessment.

FIG. 6 shows an example process 600 for autonomous vehicle routing based on chaos assessment. At operation 602, the process generates a plurality of route options based on destination objective data relative to current autonomous vehicle position data.

At operation 604, each of the plurality of route options are assessed an associated chaos level at operation 606, and based on the associated chaos level, the process generates an autonomous cooperability metric at operation 608.

Route option data may be based on map layer data, which may be provided responsive to a map layer data request 150 (FIG. 2) by a vehicle control unit 110. The route option data may operate to indicate a chaos level in a mixed autonomous and non-autonomous vehicle environment. As may be appreciated, the greater a chaos level, the lower the autonomous cooperability. Put another way, successful autonomous operation (that is, to achieve a destination) may be a function of addressing various levels of chaos. For example, a third-party collision may produce traffic congestion; however, further factors include whether all lanes are now closed due to the collision and whether the autonomous vehicle will have the capacity to re-route or simply stay on the selected route option until the collision is cleared. In other words, the degree that the artificial intelligence engine has been developed and/or matured may fluctuate among varying autonomous vehicles.

Other chaos examples may include vehicle break-down, tire failures, sudden and/or unexpected change in a manually-operated vehicle's position, speed on the road, falling rocks, etc.

When each of the plurality of route options have been assessed and generated an autonomous cooperability metric at operation 610, the process continues at operation 612 by autonomously selecting a route option of the plurality of route options that includes a favorable autonomous cooperability metric. That is, for each of the plurality of route options, the chaos level assessment may operate to assess an associated chaos level, generate an autonomous cooperability metric based on the associated chaos level, and produce an assessed route option.

As may be appreciated, varying criteria may be used to select a route option. Examples may include opting for the route having a respective lower autonomous cooperability metric. Another example may be to use an autonomous cooperability metric threshold value for an autonomous vehicle. The assessed route option 312 includes an autonomous cooperability metric that compares favorably with the autonomous cooperability metric threshold 316, such as when the autonomous cooperability metric comes within the threshold 316. An example of such a threshold may relate to the autonomous capability of an autonomous vehicle 100 (FIG. 1), which may be provided via the vehicle control unit 110 and/or other control unit of the vehicle 100. The more advanced the vehicle's autonomous capability, such as the artificial intelligence (AI) engine, an ability to adapt, etc., the higher the chaos level that the vehicle control unit 110 may accommodate to achieve the mission objective—that is, reaching a destination.

At operation 614, autonomous mission description data may be generated based on the route option selected at operation 612. Autonomous mission description data 220 may be transmitted to other modules of the vehicle 100 to provide powertrain control to autonomously engage a destination being defined by the destination objective data.

The autonomous mission description data may then be transmitted at operation 616 for autonomously engaging a destination being defined by the destination objective data. As may be also appreciated, the process 600 described herein may be provided remotely and transmitted to the vehicle control unit 110 of the autonomous vehicle 100.

Also, in the event multiple selected route options may come within the autonomous cooperability metric threshold, or have similar associated chaos levels, the route option may further be selected based on a favorable comparison with a travel time parameter and/or travel distance parameter. Such parameters may be based on an optimization algorithm (such as to optimize fuel and/or energy resources), or may be based on vehicle user input via a human-to-machine interface (such as a head unit display, a handheld mobile device app, etc.).

As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled."

As one of ordinary skill in the art will further appreciate, the term "compares favorably," as may be used herein, indicates that a comparison between two or more elements, items, signals, et cetera, provides a desired relationship.

As the term "module" is used in the description of the drawings, a module includes a functional block that is implemented in hardware, software, and/or firmware that performs one or more functions such as the processing of an input signal to produce an output signal. As used herein, a module may contain submodules that themselves are modules.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretations so as to encompass all such modifications and equivalent structures as is permitted under the law.

What is claimed is:

1. A method for routing an autonomous vehicle, the method comprising:
   generating a plurality of route options based on destination objective data relative to current autonomous vehicle position data;
   for the each of the plurality of route options, assessing an associated chaos level;
   for at least some of the plurality of route options, comparing the associated chaos level for a given route option with an autonomous cooperability metric threshold for the autonomous vehicle, each comparison indicative of whether the autonomous vehicle is capable of maintaining an autonomous mode of operation for the given route option;
   autonomously selecting a route option of the plurality of route options based on the comparisons such that the autonomous vehicle autonomously reaches a destination defined by the destination objective data;
   generating autonomous mission description data based on the selected route option; and
   transmitting the autonomous mission description data for autonomously driving the destination defined by the destination objective data.

2. The method of claim 1, wherein autonomously selecting the route option comprises selecting the route options that come within a travel time parameter.

3. The method of claim 1, wherein the generating the plurality of route options further comprises:
   ranking the plurality of route options based on a first criterion and a second criterion.

4. The method of claim 3, wherein the first criterion includes a travel distance parameter and the second criterion includes a travel time parameter.

5. The method of claim 3, wherein the first criterion and the second criterion are provided as a user preference.

6. The method of claim 1, wherein the associated chaos level is based on route condition data including at least one of:
   map layer data;
   near real-time crowd source data;
   near real-time vehicular metric data; and
   historic crowd source data.

7. The method of claim 1, wherein autonomously selecting the route option comprises autonomously selecting the route options that are within a travel distance parameter.

8. A method for autonomous vehicle routing, the method comprising:
   generating a plurality of route options based on destination objective data relative to current autonomous vehicle position data;
   parsing each of the plurality of route options to form a sectional data set;
   for the each of the plurality of route options:
      assessing an associated chaos level for each one of the sectional data set; and
      weighting the associated chaos level for the each one of the sectional data set that includes an elevated chaos level to produce a plurality of weighted chaos levels corresponding to the each one of the section data set;
   for at least some of the plurality of route options, comparing the weighted chaos level of the each one of the sectional data set for a given route option with an autonomous cooperability metric threshold for the autonomous vehicle, each comparison indicative of whether the autonomous vehicle is capable of maintaining an autonomous mode of operation for the given route option;

autonomously selecting a route option of the plurality of route options based on the comparisons such that the autonomous vehicle autonomously reaches a destination defined by the destination objective data;

generating autonomous mission description data based on the selected route option; and transmitting the autonomous mission description data for autonomously driving the destination defined by the destination objective data.

9. The method of claim 8, wherein autonomously selecting the route option comprises selecting the route options that come within a travel time parameter.

10. The method of claim 8, wherein the generating the plurality of route options further comprises:

ranking the plurality of route options based on a first criterion and a second criterion.

11. The method of claim 10, wherein the first criterion includes a travel distance parameter and the second criterion includes a travel time parameter.

12. The method of claim 10, wherein the first criterion and the second criterion are provided as a user preference.

13. The method of claim 8, wherein the associated chaos level being based on route condition data including at least one of:

map layer data;
near real-time crowd source data;
near real-time vehicular metric data; and
historic crowd source data.

14. The method of claim 8, wherein autonomously selecting the route option comprises autonomously selecting the route options that are within a travel distance parameter.

15. A vehicle control unit for an autonomous vehicle comprising:

a wireless communication interface to service communication with a vehicle network;

a processor communicably coupled to the wireless communication interface; and memory communicably coupled to the processor and storing:

a route generation module including instructions that, when executed by the processor, cause the processor to:

generate a plurality of route options based on destination objective data relative to current autonomous vehicle position data;

for the each of the plurality of route options, assess an associated chaos level; and an autonomous mission description module including instructions that, when executed by the processor, cause the processor to:

receive the route option for the each of the plurality of route options;

for at least some of the plurality of route options, compare the associated chaos level for a given route option with an autonomous cooperability metric threshold for the autonomous vehicle, each comparison indicative of whether the autonomous vehicle is capable of maintaining an autonomous mode of operation for the given route option;

autonomously select a route option of the plurality of route options based on the comparisons such that the autonomous vehicle autonomously reaches a destination defined by the destination objective data; and generate autonomous mission description data based on the selected route option for transmission to autonomously drive the destination defined by the destination objective data.

16. The vehicle control unit of claim 15, wherein the autonomous mission description module further includes instructions to autonomously select the route options that come within a travel time parameter.

17. The vehicle control unit of claim 15, wherein the associated chaos level being based on route condition data including at least one of:

map layer data;
near real-time crowd source data;
near real-time vehicular metric data; and
historic crowd source data.

18. The vehicle control unit of claim 15, wherein the autonomous mission description module further includes instructions to autonomously select the route options that are within a travel distance parameter.

19. The vehicle control unit of claim 15, wherein the route generation module further includes instructions to rank the plurality of route options based on a first criterion and a second criterion.

20. The vehicle control unit of claim 19, wherein the first criterion includes a travel distance parameter and the second criterion includes a travel time parameter.

* * * * *